Patented Feb. 9, 1954

2,668,835

UNITED STATES PATENT OFFICE 2,668,835

TRIS(O-ETHYL DIMETHYLAMIDOPHOSPHORYL) PHOSPHATE

Henry Tolkmith, Midland, Mich., assignor to The Dow Chemical Company, Midland, Mich., a corporation of Delaware No Drawing. Application January 29, 1953,
Serial No. 334,071

1 Claim. (Cl. 260—461)

This invention is directed to tris(O-ethyl dimethylamidophosphoryl) phosphate of the formula

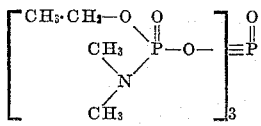

This compound is an oily liquid somewhat soluble in many organic solvents and water. It is of value as an intermediate for the preparation of more complex derivatives and as a toxic constituent of parasiticide compositions.

The new compound may be prepared by reacting 1 molecular proportion of phosphorus oxychloride with at least 3 molecular proportions of O,O-diethyl dimethylamidophosphate of the formula

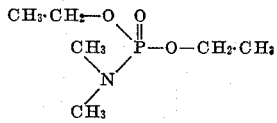

The reaction involves a condensation resulting in the formation of ethyl chloride. In practice, substantially all the chlorine in the phosphorus oxychloride may be recovered as ethyl chloride. If desired, the reaction may be carried out in an inert organic solvent such as toluene or xylene.

In carrying out the reaction, the phosphorus oxychloride and O,O-diethyl dimethylamidophosphate are mixed together and the resulting dispersion heated at a temperature of from 90° to 135° C. until the evolution of ethyl chloride of reaction is substantially complete. The reaction takes place smoothly at the temperature range of 90° to 135° C., and at a rate which varies directly with the employed temperature. Since the desired tetraphosphate products have a tendency to rearrange into other materials at temperatures in excess of 135° C., such elevated reaction temperatures should not be employed for any appreciable period of time. Upon completion of the reaction, the mixture may be distilled under reduced pressures at gradually increasing temperatures up to a temperature of 135° C. to separate low boiling constituents and to obtain as a residue the desired tris(O-ethyl dimethylamidophosphoryl) phosphate.

In a representative operation, 10.4 grams (0.068 mole) of phosphorus oxychloride and 36.1 grams (0.20 mole) of O,O-diethyl dimethylamidophosphate were mixed together and the resulting dispersion heated at a temperature of 115° C. until the evolution of ethyl chloride was substantially complete. The heating was carried out with stirring and over a period of about 3 hours. During the heating, by-product ethyl chloride was separated and recovered from the reaction zone as formed. As a result of these operations, a tris(O-ethyl dimethylamidophosphoryl) phosphate product was obtained in substantially quantitative yield as an oily liquid having a density of 1.2671 and a refractive index $n/D$ of 1.4470 at 20° C.

The O,O-diethyl dimethylamidophosphate employed as a starting material, as described above, is an oily liquid having a density of 1.0485 and a refractive index $n/D$ of 1.4320 at 20° C. This product may be prepared by reacting 1 molecular proportion of dimethylamidophosphoric dichloride with 2 molecular proportions of sodium ethylate. The reaction is somewhat exothermic and takes place readily at a temperature of from 30° to 80° C. The temperature may be controlled by regulating the rate of contact of the reactants, as well as by the addition and subtraction of heat, if required. Upon completion of the reaction, the mixture may be filtered and the filtrate fractionally distilled under reduced pressure to separate the desired product.

The new tris(O-ethyldimethylamidophosphoryl) phosphate product is effective as a parasiticide and adapted to be employed for the control of a wide range of agricultural and household pests such as flies, mites, aphids, beetles and cockroaches. For such use, the compound may be dispersed on an inert finely divided solid and employed as a dust. Also, such mixtures may be dispersed in water with the aid of a dispersing and wetting agent and the resulting aqueous suspensions employed as sprays. In other procedures, the new product may be employed in oils, as a constituent in oil-in-water emulsions, or in water dispersion with or without the addition of emulsifying, wetting or dispersing agents. Suitable concentrations of the toxicant in dusts are in the order of from about 0.1 to 10 percent by weight of the dust and in liquid suspensions from about 0.1 to 3 pounds per 100 gallons of the spray mixture. In representative operations against two-spotted spider mites, bean aphids and Mexican bean beetles, 100 percent kills of these pests were obtained with aqueous spray compositions containing 0.5 pound of the toxic phosphate per 100 gallons of spray mixture.

This is a continuation-in-part of my copending application Serial No. 242,407, filed August 17, 1951.

I claim:

Tris(O-ethyl dimethylamidophosphoryl) phosphate.

HENRY TOLKMITH.

No references cited.